United States Patent
Engel

(10) Patent No.: US 7,287,192 B1
(45) Date of Patent: Oct. 23, 2007

(54) IDENTIFYING A FAILED DEVICE IN A NETWORK

(75) Inventor: Fred Engel, Northboro, MA (US)

(73) Assignee: Computer Associates Think, Inc., Islandia, NY (US)

( * ) Notice: Subject to any disclaimer, the term of this patent is extended or adjusted under 35 U.S.C. 154(b) by 0 days.

(21) Appl. No.: 09/401,874

(22) Filed: Sep. 23, 1999

(51) Int. Cl.
*G06F 11/00* (2006.01)

(52) U.S. Cl. .............................. 714/43; 714/4

(58) Field of Classification Search .................. 714/43, 714/4, 11–13, 25, 41, 44, 47; 709/218, 220, 709/227, 239; 370/244, 248, 351
See application file for complete search history.

(56) References Cited

U.S. PATENT DOCUMENTS

| | | | | |
|---|---|---|---|---|
| 5,157,667 A | * | 10/1992 | Carusone, Jr. et al. | 714/48 |
| 5,253,184 A | * | 10/1993 | Kleinschnitz | 714/48 |
| 5,383,201 A | * | 1/1995 | Satterlee et al. | 714/57 |
| 5,436,909 A | | 7/1995 | Dev et al. | 371/20.1 |
| 5,539,877 A | * | 7/1996 | Winokur et al. | 714/26 |
| 5,740,354 A | * | 4/1998 | Ben-Natan et al. | 714/45 |
| 5,751,965 A | | 5/1998 | Desroches et al. | |
| 5,774,645 A | * | 6/1998 | Beaujard et al. | 714/25 |
| 5,778,184 A | * | 7/1998 | Brownmiller et al. | 395/200.54 |
| 5,784,359 A | * | 7/1998 | Bencheck et al. | 370/244 |
| 5,787,074 A | * | 7/1998 | Brownmiller et al. | 370/244 |
| 5,923,840 A | * | 7/1999 | Desnoyers et al. | 714/48 |
| 6,038,600 A | * | 3/2000 | Faulk et al. | 709/224 |
| 6,115,393 A | * | 9/2000 | Engel et al. | 370/469 |
| 6,138,161 A | * | 10/2000 | Reynolds et al. | 709/227 |
| 6,230,216 B1 | * | 5/2001 | Chambers et al. | 710/4 |
| 6,321,283 B1 | * | 11/2001 | Ventura | 710/107 |
| 6,425,101 B1 | * | 7/2002 | Garreau | 714/727 |

FOREIGN PATENT DOCUMENTS

| | | |
|---|---|---|
| EP | 0 909056 A3 | 4/1999 |
| EP | 0 909056 A2 | 4/1999 |

OTHER PUBLICATIONS

International Preliminary Examination Report of PCT/US00/26051; mailed Dec. 14, 2001.
European Search Report of 00963723.2–2413 ex rel PCT/US00/26051; mailed Feb. 12, 2003.
Communication pursuant of EPC Article 96(2) of 00963723.3–2413 ex rel PCT00/26051; mailed May 16, 2003.
International Preliminary Examination Report of PCT/US00/26051; mailed Dec. 14, 2001.
European Search Report of 00963723.2–2413.ex rel PCT/US00/26051; mailed Feb. 12, 2003.
Communication pursuant to EPC Article 96(2) of 00963723.2–2413 ex rel PCT00/26051; mailed May 16, 2003.

* cited by examiner

*Primary Examiner*—Dieu-Minh Le
(74) *Attorney, Agent, or Firm*—Pillsbury Winthrop Shaw Pittman LLP

(57) ABSTRACT

A failed device is identified in a network that includes plural devices. To begin, an attempt is made at communication with a target device. If the attempt at communication with the target device fails, it is determined if the target device has an active neighbor. If the target device has an active neighbor, the target device is identified as a failed device.

39 Claims, 4 Drawing Sheets

IDENTIFYING A FAILED DEVICE IN A NETWORK

BACKGROUND OF THE INVENTION

The present invention relates to identifying a failed device on a network.

Data packets on a network are transmitted through devices, such as routers and switches, on the way to their destinations. In many networks, these devices are connected in such a way that failure of one device can make an entire branch of the network inaccessible. For example, if a device is the only route to several other devices, failure of that device will prevent data packets from reaching those other devices and their downstream destinations.

To restore full network service, a failed device must be identified and repaired. The failed device can be identified by determining the topology of the entire network and then locating the failed device using the topology. This approach, however, can be computationally intensive, particularly where the network topology changes over time.

SUMMARY OF THE INVENTION

One aspect of the invention identifies a failed network device based on information obtained from the device's neighbors. In particular, each device on the network stores information, such as Management Information Base ("MIB") II tables, that specifies which other devices are connected to the device. This information is compiled and used to generate a neighbor table for the network.

In the event of a device failure, the neighbor table is used to identify which device failed. More specifically, a packet is sent to a target device in order to determine if the target device is active. If the target device is not active, the neighbor table is consulted in order to locate devices that neighbor the target device. It is then determined if any of the target device's neighbors are active. If so, the target device is identified as being a failed device. If not, the process is repeated for the neighbors until an active device is located.

The various embodiments of the invention possess one or more of the following advantages. First, the user can identify failed network devices without having to determine the entire network topology. Stated differently, the embodiments enable the user to identify failed devices on the network by retrieving significantly less information about the network than has been previously thought necessary. Another benefit of the various embodiments is they can be used from any vantage point on the network without requiring hardware or software reconfiguration.

In general, in one aspect, the invention identifies a failed device in a network that includes plural devices. This aspect includes attempting to communicate with a target device and determining if the target device has an active neighbor if the attempt to communicate with the target device fails. The target device is identified as a failed device if the target device has an active neighbor.

In other aspects, the invention includes one or more of the following features/functions. The attempting comprises sending a packet to the target device and waiting for a response from the target device. The determining comprises attempting to communicate with a neighbor of the target device. The neighbor is determined to be active if the attempt to communicate is successful.

The neighbor of the target device is located by generating a neighbor table for the network and consulting the neighbor table. Generating comprises polling the target device, receiving a response from the target device, and constructing the neighbor table based on the response. The polling is performed periodically. The neighbor table is updated based on the periodic polling. The response comprises a network address of the neighbor. The neighbor table indexes the target device to the network address of the neighbor. The target device stores a MIB II (or other type of) table containing the network address of the neighbor. The target device prepares the response based on the MIB II table. The target device and the neighbor can comprises a router, a switch, a server, a personal computer, or any other type of networked device.

In general, in another aspect, the invention identifies a failed device in a network that includes plural devices by generating a neighbor table for the devices based on information provided from the devices and sending a packet to a target device to determine if the target device is active. If the target device is not active, a neighbor of the target device is located using the neighbor table and a packet is sent to the neighbor to determine if the neighbor is active. The target device is identified as a failed device if the neighbor is active.

In general, in another aspect, the invention features a network system that includes first, second and third devices, where the third device is located in a path between the first and second devices. The first device includes a processor and memory which stores executable code. The processor executes code to send a packet to the second device to determine if the second device is active. If the second device is not active, the processor sends a packet to the third device to determine if the third device is active. The processor identifies the second device as a failed device if the third device is active.

Advantages of the invention in addition to those set forth above will become apparent in view of the following description, including the claims and the drawings.

DESCRIPTION OF THE PREFERRED EMBODIMENTS

Figure 1:
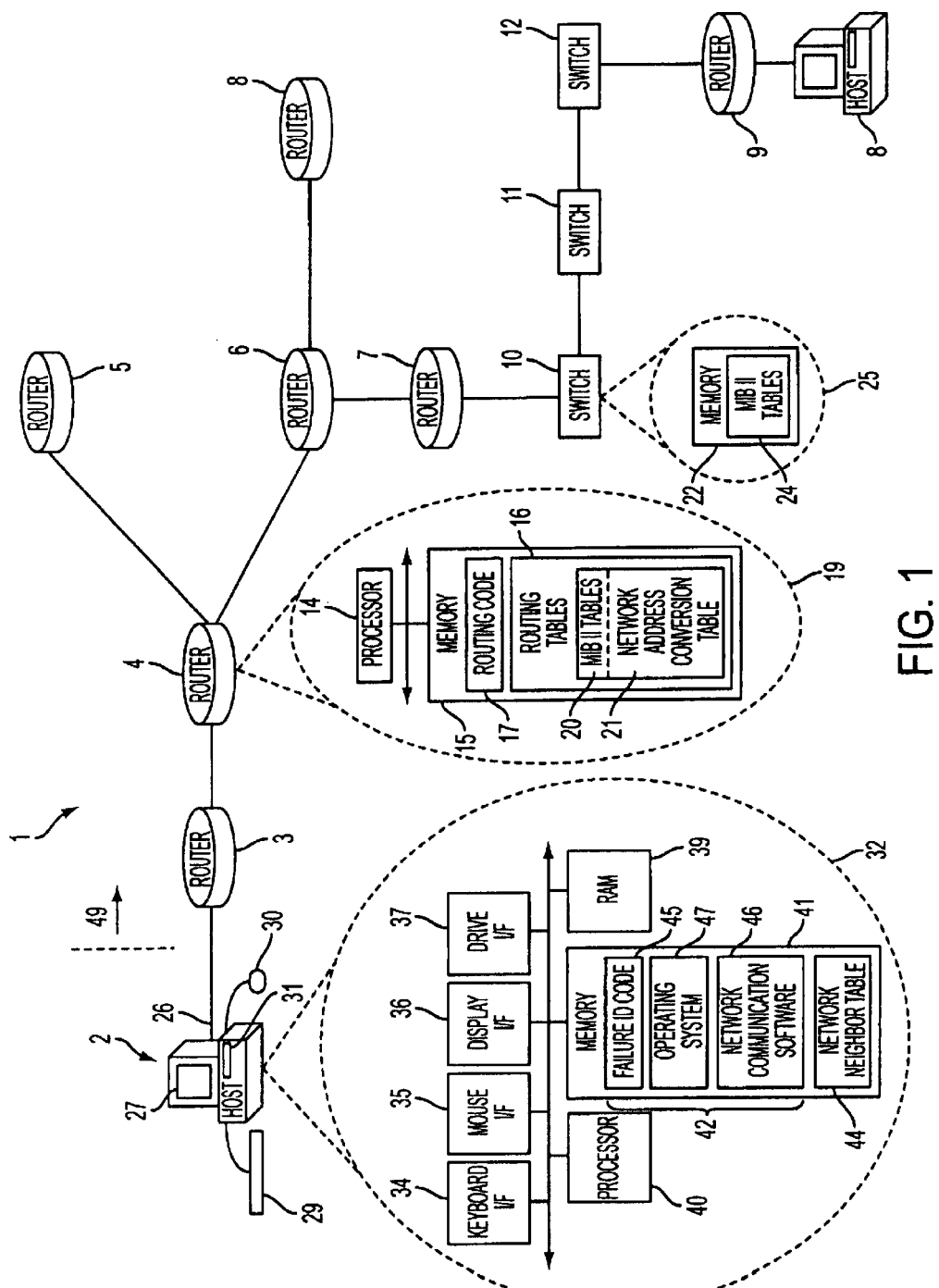
FIG. 1 shows a network topology.

FIG. 1 shows a network 1 on which an embodiment is implemented. Network 1 may be any kind of network, such as a local area network ("LAN"), a wide area network ("WAN"), or the Internet. Components of network 1 include hosts 2 and 8, routers 3 to 9, and switches 10 to 12.

Routers 3 to 9 are computing devices for routing data packets through network 1 based on the packets' Internet Protocol ("IP") addresses. Each router includes a processor 14 and a memory 15 which stores routing tables 16 and routing code 17 (see view 19 of router 4). Code 17 is executed by processor 14 to route data packets through network 1. The information stored in routing tables 16 is used to perform the routing.

Routing tables 16 include MIB II tables 20 (see "Management Information Base For Network Management Of TCP/IP-Based Internets: MIB II", RFC 1213 (March 1991)).

In particular, MIB II tables 20 are "atNetAddress" tables which contain the IP addresses of devices that neighbor the router. For example, in router 4 MIB II tables 20 contain the IP addresses of routers 3, 5 and 6, and the IP addresses of each interface (or "socket") to routers 3, 5 and 6 (each router has a device IP address and each socket on that router can have a separate IP address).

MIB II tables 20 also include network address conversion tables 21, examples of which are the MIB II "Address Translation" tables and "ipNetToMediaTable". The conversion tables in each router store the MAC and IP addresses of devices that neighbor the router and are used to convert MAC addresses to IP addresses, and vice versa, during routing.

Switches 10 to 12 are electronic devices for routing data packets by device address. The IP/MAC address conversion tables in the routers perform the network address conversions required to route data packets between switches and routers. Each switch includes a memory 22 which stores MIB II tables 24 (see view 25 of switch 10). In some switches, MIB tables 24 contain "atNetAddress" tables which identify the switch's neighbors by IP address. In other switches, however, MIB tables 24 identify the switch's neighbors by MAC address, and not by IP address. Specifically, these switches use the MIB II "ifPhysAddress" table to identify their neighbors.

Host 2 is a personal computer ("PC") or similar device that is capable of communicating on network 1. Included in host 2 are the following: network connection 26 for interfacing to network 1, display screen 27 for displaying information to a user, keyboard 29 for inputting text and commands, mouse 30 for positioning a cursor on display screen 27 and inputting user commands, and drive 31 for accessing data stored on a computer-readable storage medium such as a computer diskette, a CD-ROM, or a DVD. View 32 shows the architecture of host 2. Included in host 2 are keyboard interface 34, mouse interface 35, display interface 36, drive interface 37, RAM 39, processor 40, and memory 41. Memory 41 stores code 42 and a network neighbor table 44. Network neighbor table 44 identifies each device on network 1 (such as a router, switch or PC) and the neighbors of that device. Specifically, network neighbor table 44 indexes the IP address of each device to the IP addresses of its neighboring devices.

Code 42 (which, alternatively, may be stored in a storage medium in drive 31) is executed by processor 40 out of RAM 39. Code 42 includes failure identifier 45, network communication software 46, and operating system 47. Operating system 47 is a windowing operating system, such as Microsoft® WindowsNT®; however, other types of operating systems may be used. Network communication software 46 includes IP protocol stack layers and other necessary code for transmitting data packets to, and receiving data packets from, network 1. Failure identifier 45 detects a failure in network 1 and identifies the failed device in accordance with the process of FIG. 2.

Figure 3:
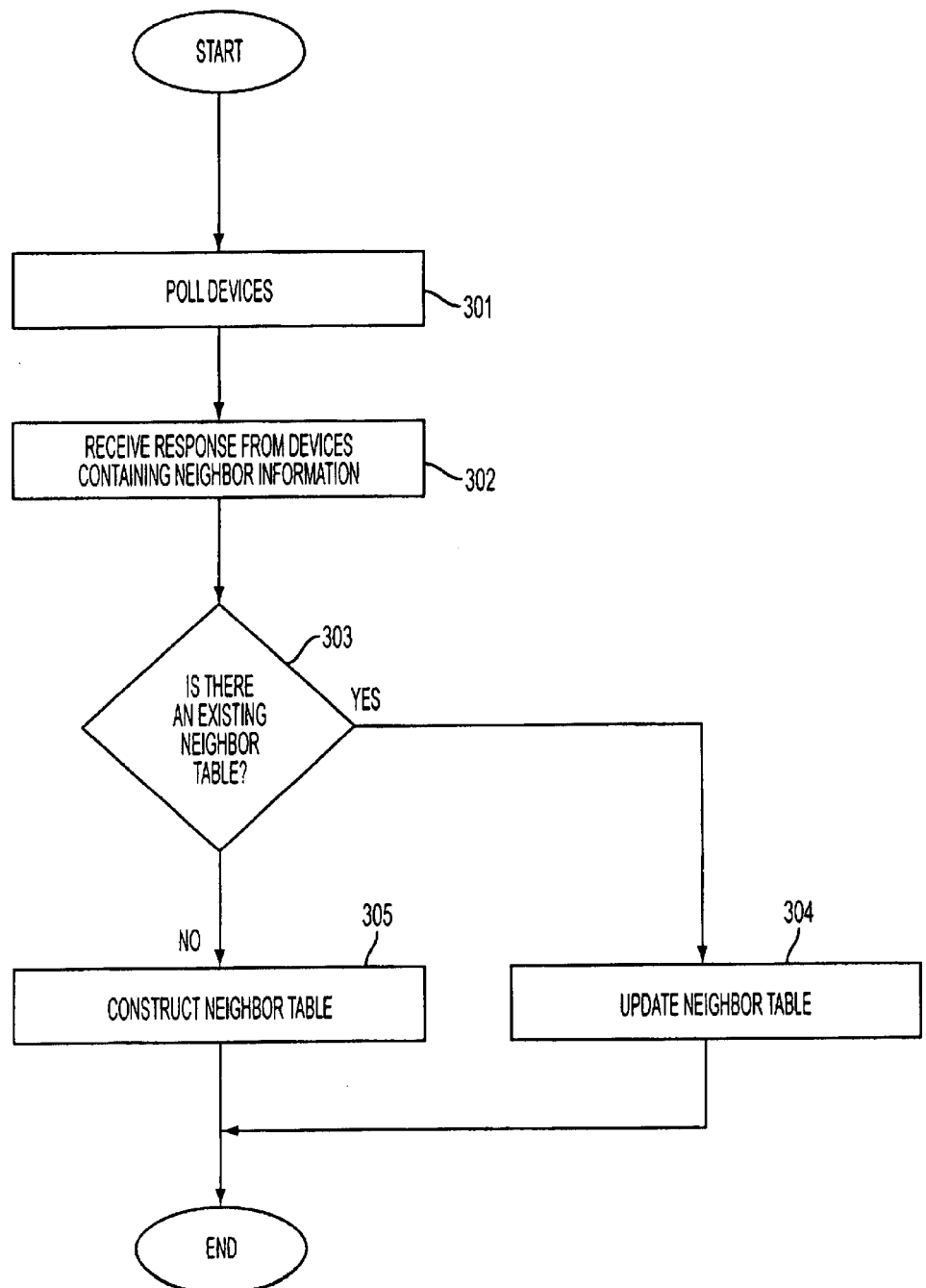
FIG. 3 shows a process for generating a neighbor table for the network.

Prior to that process, however, host 2 generates/updates a neighbor table for network 1 according to the process of FIG. 3. To begin, host 2 polls 301 devices 49 on network 1 using network communication software 46. Polling is performed periodically (e.g., every hour, five minutes, or less) by sending a data packet to the IP address of each device and then waiting for a response.

In 302, host 2 receives a response from each active device on the network. This response is prepared by each device based on the information contained in the device's MIB II tables. The response contains an IP address of the polled device, together with the IP addresses of its neighbors. The IP addresses in the response could be device IP addresses. For example, when polled in 303, router 4 may return its device IP address, the device IP address of router 3, and device addresses of routers 5 and 6.

Switches, such as switch 11, may return MAC addresses of their neighbors, instead of IP addresses, for reasons noted above. Conversion tables in host 2 or in an upstream router (relative to switch 11) are used to convert switch MAC addresses into IP addresses. Verification of device neighbors may also be performed at host 2 using MIB II "atNetatPhysAddress" and "ifPhysAddress" tables.

Host 2 then determines 303 whether there is an existing network neighbor table for network 1. If so, host 2 updates 304 the existing table based on responses received in 302. Specifically, host 2 determines if the information in the responses contradicts information in the existing network neighbor table and, if so, substitutes that information with the information from the responses. If there is no existing network neighbor table, host 2 constructs a new network neighbor table based on the information received in 302, and stores it in memory 41.

Figure 2:
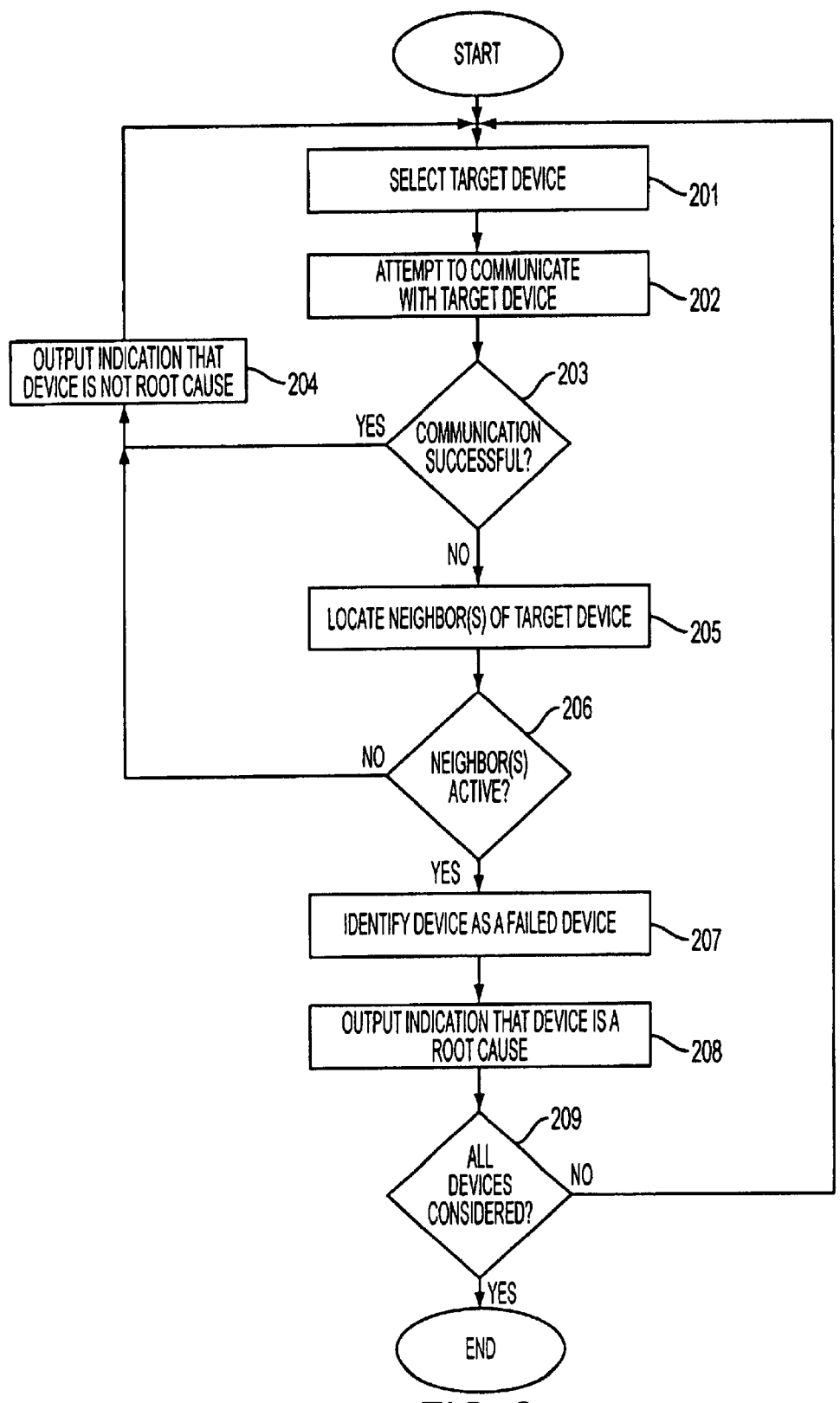
FIG. 2 shows a process for identifying a failed device in the network.

Once a current network neighbor table is in place, the process of FIG. 2 is executed to identify failed devices on network 1. The process of FIG. 2 may be performed periodically, such as every five minutes, without regard to whether an outage in the network has been detected. Alternatively, the process may be performed upon detection of an outage. An outage may be detected in any number of ways. For example, host 2 may send a data packet to a destination and receive a message indicating that the packet is "undeliverable" which indicates a network outage.

In 201, host 2 selects a target device on network 1. Network neighbor table 44 defines the active devices on network 1. Therefore, the target device is selected from the devices listed in network neighbor table 44 including, but not limited to, routers, switches, and other hosts. The devices may be selected in any order.

Next, host 2 attempts 202 to communicate with the target device. The attempt is performed by sending a packet to the target device and waiting for a response (this is called "pinging" the target device). If the target device responds, the attempt to communicate has been successful 203, meaning that the target device is active and, therefore, not the root cause of an outage (where "root cause" refers to the first failed device on a path from host 2 to a desired network destination). In this case, host 2 outputs an indication 204 that the target device is not the root cause of the outage, selects 201 a new target device, and repeats 202 and 203. If the target device does not respond, host 2 locates 205 the neighbor(s) of the target device by consulting network neighbor table 44.

Host 2 then determines 206 if any of the neighbors are active. This is done by sending a data packet to each neighbor and then waiting for a response. If there are no responses from the neighbors, there are no active devices interfaced to the target device, which means that the target device is not the root cause of the outage. In this case, host 2 outputs an indication that the target device is not the root cause of the outage. Host 2 then selects 201 a new target device and repeats 202 to 206. If, however, there is a response from one of the target device's neighbors, there is an active communication path between host 2 and the target device, which means that the target device is the root cause of the outage. Accordingly, host 2 identifies 207 the target router as the root cause of the outage. Host 2 then outputs 208 an indication (such as a display, an alarm, a page, or an electronic mail) that the target router is the root cause. If all devices have been considered 209 (see below), the process ends; otherwise it returns to 201.

By way of example, assume that router 4 (see FIG. 1) is the root cause of an outage that affects routers 5 to 9 and switches 10 to 12. If router 7 is selected 201 as the target device, host 2 attempts 202 to communicate with router 7. Communication will be unsuccessful 203, since router 7 is part of the outage. Therefore, host 2 locates 205 neighbors of router 7 and determines 206 if any of them are active. Router 7's only neighbors are router 6 and switch 10. Both of these were also affected by the outage. Therefore, there is no active communication path between host 2 and router 7, which means that router 6 is not the root cause of the outage.

If router 6 is next selected 201 as the target device, host 2 attempts 202 to communicate with router 6. Communication will be unsuccessful 203 since router 6 is part of the outage. Therefore, host 2 locates 205 router 6's neighbors and determines 206 if any of them are active. Router 6's only neighbors are routers 4, 5, 7 and 8. These were all affected by the outage. Therefore, router 6 is not the root cause of the outage.

If router 4 is next selected 201 as the target device, host 2 attempts 202 to communicate with router 4. Communication will be unsuccessful 203 since router 4 is part of the outage. Therefore, host 2 locates router 4's neighbors 205 and determines 206 if any of them are active. Router 4's neighbors are routers 3, 5 and 6. Routers 5 and 6 are not active, since they are downstream from the outage relative to host 2. However, router 3 is active, which means that there is an active communication path between host 2 and router 3. Accordingly, router 4 is the first inactive router downstream from host 2 and thus is the root cause of the outage.

Figure 4:
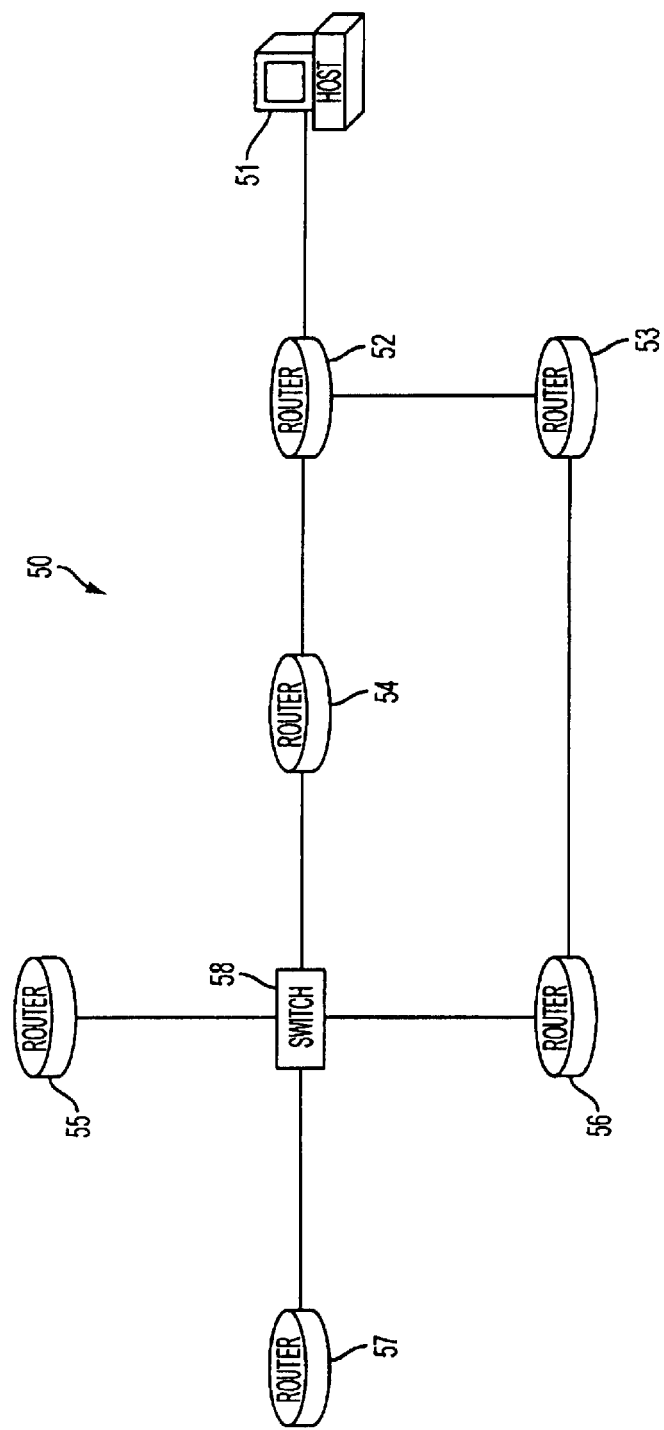
FIG. 4 shows an alternative network topology on which the invention may be used.

FIG. 4 shows another network on which the invention may be used. Network 50 includes host 51, routers 52 to 57, and switch 58. These device are the same, in both structure and function, as corresponding devices of FIG. 1.

In network 50, an outage has left routers 54 to 57 and switch 58 inactive. To find the root cause of the outage, the process of FIG. 2 is executed. This process eventually results in host 51 selecting 201 router 56 as the target router. From there, host 51 attempts to communicate 202 with router 56. These attempts will be unsuccessful 203 since router 56 was affected by the outage; therefore, host 51 will locate 205 the neighbors of router 56. Router 56's neighbors are switch 58 and router 53. By trying to communicate with the neighbors, host 51 determines 206 that router 53 is active and that switch 54 is not active. Since router 56 has an active neighbor, router 56 is identified as the root cause of the failure in 207 and an indication to that effect is output in 208.

However, the process does not end there. In 210, host 2 determines whether all network devices have been considered. If not, as we assume here, the process returns to 201. From there, the process eventually results in host 51 selecting 201 router 54 as the target router. Host 51 therefore attempts to communicate 202 with router 54. These attempts will be unsuccessful 203 since router 54 was affected by the outage; therefore, host 51 will locate 205 the neighbors of router 54. Router 54's neighbors are switch 58 and router 52. By trying to communicate with the neighbors, host 51 determines that router 52 is active 206 and that switch 54 is not active. Therefore, router 54 is identified as another root cause of the failure in 207 and an indication to that effect is output in 208.

Thus, as illustrated in FIG. 4, a single outage may have more than one root cause—in that case, both routers 54 and 56. The invention will also identify failed devices in outages that have more than two root causes.

As described above, the illustrated embodiment relies on tables in a device to provide network addresses of the device's neighbors. If a device does not include such a table, as may be the case for some types of switches, it may be possible to deduce the presence of such devices, at least to a degree.

For example, if switches 10 to 12 do not respond with neighbor addresses in 302 (FIG. 3), but router 9 does, switch 12 and router 9 will appear disconnected from network 1 in the network neighbor table. However, since router 9 provided the requested information, this cannot be the case. Knowing this, and that router 9 is connected to switch 12 (based on router 9's response in 302), it can be deduced that there is at least one device between switch 12 and another device on network 1.

Note that the invention is not limited to the specific hardware and software configurations described above. For example, any tables that contain device neighbor addresses can be used in place of MIB II tables. TL1 tables are an example. Similarly, protocols other than IP, and network addresses other than IP and MAC addresses, can be used in the invention. The invention can also be used with networks having different router and switch configurations than those shown in FIGS. 1 and 4. The invention can be implemented at different nodes of a network. For example, in the network of FIG. 1, the invention can be implemented from host 2 (as described), from host 8, or from any other devices (not shown) at nodes of the network.

The present invention has been described with respect to a particular illustrative embodiment. It is to be understood that the invention is not limited to the above-described embodiment and modifications thereto, and that various changes and/or modifications are within the scope of the appended claims.

What is claimed is:

1. A method of troubleshooting a network that includes a plurality of devices, said method comprising:
   attempting to communicate with a target device among the plurality of devices, said target device having a neighbor;
   if the attempt to communicate with the target device fails, determining if the target device has an active neighbor by attempting to communicate with said neighbor; and
   if it is determined that said neighbor is an active neighbor, identifying the target device as a failed device.

2. The method according to claim 1, wherein the method is implemented by a computer on the network.

3. The method according to claim 2, wherein determining if the target device has an active neighbor comprises:
   identifying a neighbor of the target device;
   attempting to communicate with the identified neighbor of the target device; and
   if the attempt to communicate with the identified neighbor is successful, concluding that the identified neighbor is active.

4. The method according to claim 2, further comprising locating a neighbor of the target device.

5. The method according to claim 4, wherein the locating comprises:
   generating a neighbor table for the network; and
   consulting the neighbor table to locate the neighbor of the target device.

6. The method according to claim 5, wherein the generating comprises:
   polling the target device;
   receiving a response from the target device; and
   constructing the neighbor table based on the response.

7. The method according to claim 6, wherein:
   the polling is performed periodically; and
   the method further comprises updating the neighbor table based on the periodic polling.

8. The method according to claim 6, wherein:
   the response comprises a network address of the neighbor; and
   the neighbor table indexes the target device to the network address of the neighbor.

9. The method according to claim 8, wherein the target device:
   stores a Management Information Base (MIB) II table containing the network address of the neighbor; and
   prepares the response based on the MIB II table.

10. The method according to claim 2, wherein the target device comprises a router or a switch, and the neighbor comprises a router, a switch, or a computer.

11. The method according to claim 1, wherein the attempting to communicate with the target device involves sending a communication to said target device.

12. The method according to claim 11, wherein the attempting to communicate with the one or more neighbors of the target device involves sending a communication to said one or more neighbors of the target device.

13. A method of troubleshooting a network that includes a plurality of devices, said method comprising:
   receiving information from the plurality of devices;
   generating a neighbor table for the network based on the information provided by the plurality of devices; and
   attempting to communicate with a target device among the plurality of devices to determine if the target device is active;
   wherein, if the target device is determined to be not active, the method further comprises:
      using the neighbor table to identify a neighbor of the target device;
      attempting to communicate with the identified neighbor to determine if the identified neighbor is active; and
      if the identified neighbor is determined to be active, identifying the target device as a failed device.

14. The method according to claim 13, wherein the attempting to communicate with the target device involves sending a communication to said target device.

15. The method according to claim 14, wherein the attempting to communicate with the identified neighbor involves sending a communication to said identified neighbor.

16. An apparatus for troubleshooting a network that includes a plurality of devices, said apparatus comprising:
   a host computer including a processor; and
   a memory which stores executable code which when executed by said processor causes said host computer to (i) attempt to communicate with a target device among the plurality of devices, said target device having a neighbor, (ii) if the attempt to communicate with the target device fails, determine if the target device has an active neighbor by attempting to communicate with said neighbors, and (iii) if it is determined that said neighbor is an active neighbor, identify the target device as a failed device.

17. The apparatus according to claim 16, wherein the processor attempts to communicate with the target device by sending a packet to the target device and waiting for a response from the target device.

18. The apparatus according to claim 16, wherein:
   the processor determines if the target device has an active neighbor by attempting to communicate with a neighbor of the target device; and
   the neighbor is determined to be active if the attempt to communicate is successful.

19. The apparatus according to claim 16, wherein the processor executes code to locate a neighbor of the target device.

20. The apparatus according to claim 19, wherein the processor locates the neighbor by:
   generating a neighbor table for the network; and
   consulting the neighbor table.

21. The apparatus according to claim 20, wherein the processor generates the neighbor table by:
   polling the target device;
   receiving a response from the target device; and
   constructing the neighbor table based on the response.

22. The apparatus according to claim 21, wherein the processor performs the polling periodically and updates the neighbor table based on the periodic polling.

23. The apparatus according to claim 21, wherein:
   the response comprises a network address of the neighbor; and
   the neighbor table indexes the target device to the network address of the neighbor.

24. The apparatus according to claim 16, wherein the target device comprises a router or a switch, and the neighbor comprises a router or a switch.

25. The apparatus according to claim 16, wherein the executable code causes the host computer to attempt to with the target device by sending a communication to said target device.

26. The apparatus according to claim 25, wherein the executable code causes the host computer to determine if the target device has an active neighbor by sending a communication to said one or more neighbors of the target device.

27. A computer program stored in a computer-readable medium, said program for troubleshooting a network that includes a plurality of devices, said program comprising:
   code for attempting to communicate with a target device among the plurality of devices, said target device having a neighbor;
   code for determining if the target device has an active neighbor in response to a failure of an attempted communication with the target device, said code for determining causing an attempt to communicate with said neighbor; and
   code for identifying the target device as a failed device if said neighbor is determined to be an active neighbor.

28. The computer program according to claim 27, wherein the attempting code sends a packet to the target device and waits for a response from the target device.

29. The computer program according to claim 27, wherein:
   the determining code attempts to communicate with a neighbor of the target device; and
   the neighbor is determined to be active if an attempted communication is successful.

30. The computer program according to claim 27, further comprising code to locate a neighbor of the target device.

31. The computer program according to claim 30, wherein the locating code comprises:
   code to generate a neighbor table for the network; and
   code to consult the neighbor table to locate the neighbor of the target device.

32. The computer program according to claim 31, wherein the generating code comprises:
   code to poll the target device;
   code to receive a response from the target device; and
   code to construct the neighbor table based on the response.

33. The computer program according to claim 32, wherein:
   the polling code performs the polling performed periodically; and
   the computer program further comprises code to update the neighbor table based on the periodic polling.

34. The computer program according to claim 32, wherein:
   the response comprises a network address of the neighbor; and
   the neighbor table indexes the target device to the network address of the neighbor.

35. The computer program according to claim 27, wherein the target device comprises a router or a switch, and the neighbor comprises a router or a switch.

36. The computer program according to claim 27, wherein the code for attempting to communicate with the target device includes code for attempting to communicate by sending a communication to said target device.

37. The computer program according to claim 36, wherein the code for determining if the target device has an active neighbor includes code for determining if the target device has an active neighbor by sending a communication to said one or more neighbors of the target device.

38. A network system comprising:
   a first device;
   a second device; and
   a third device located in a path between the first device and the second device on a network;
   wherein the first device comprises:
      a computer including a processor; and
      a memory which stores executable code which when executed by said processor causes said computer to (i) send a packet to the second device to determine if the second device is active, (ii) if the second device is not active, send a packet to the third device to determine if the third device is active, and (iii) if the third device is determined to be active, identify the second device as a failed device.

39. The network system according to claim 38, wherein the first device comprises a computer, the second device comprises a switch or a router, and the third device comprises a switch or a router.

* * * * *

UNITED STATES PATENT AND TRADEMARK OFFICE
CERTIFICATE OF CORRECTION

| | | |
|---|---|---|
| PATENT NO. | : 7,287,192 B1 | Page 1 of 1 |
| APPLICATION NO. | : 09/401874 | |
| DATED | : October 23, 2007 | |
| INVENTOR(S) | : Engel | |

It is certified that error appears in the above-identified patent and that said Letters Patent is hereby corrected as shown below:

Title page, item (75) Inventors: Delete "Fred" and insert --Ferdinand--.

Signed and Sealed this

Sixth Day of May, 2008

JON W. DUDAS
*Director of the United States Patent and Trademark Office*